United States Patent
Mikulecky et al.

(10) Patent No.: US 11,020,914 B2
(45) Date of Patent: Jun. 1, 2021

(54) TRIDIRECTIONAL LAID SCRIMS FOR REINFORCEMENT PURPOSES

(71) Applicant: SAINT-GOBAIN ADFORS, Courbevoie (FR)

(72) Inventors: Bohuslav Mikulecky, Usti Nad Orlici (CZ); Jan Mraz, Zirovnice (CZ); Vratislav Honzalek, Borova (CZ); Lukas Kulhavy, Nove Hrady (CZ)

(73) Assignee: SAINT-GOBAIN ADFORS, Courbevoie (FR)

( * ) Notice: Subject to any disclaimer, the term of this patent is extended or adjusted under 35 U.S.C. 154(b) by 60 days.

(21) Appl. No.: 16/063,591

(22) PCT Filed: Dec. 16, 2016

(86) PCT No.: PCT/EP2016/081565
§ 371 (c)(1),
(2) Date: Jun. 18, 2018

(87) PCT Pub. No.: WO2017/108631
PCT Pub. Date: Jun. 29, 2017

(65) Prior Publication Data
US 2018/0371657 A1   Dec. 27, 2018

(30) Foreign Application Priority Data

Dec. 21, 2015  (EP) ..................................... 15201616

(51) Int. Cl.
*B29C 70/68*   (2006.01)
*B29B 15/10*   (2006.01)
(Continued)

(52) U.S. Cl.
CPC ............ *B29C 70/688* (2013.01); *B29B 15/10* (2013.01); *B29C 70/682* (2013.01);
(Continued)

(58) Field of Classification Search
CPC ................................... D04H 3/12; B32B 5/028
See application file for complete search history.

(56) References Cited

U.S. PATENT DOCUMENTS 7,914,884 B2 *  3/2011  Royer .................... D02G 3/447
                                                    428/113
8,231,700 B2 *  7/2012  Sundet ............... B01D 39/1623
                                                     55/487

(Continued)

FOREIGN PATENT DOCUMENTS

EP     0 865 525 B1    8/2004
FR     1 600 755       7/1970
(Continued)

OTHER PUBLICATIONS

"Synthetic Mineral Fibers." Synthetic Mineral Fibers—Overview | Occupational Safety and Health Administration, www.osha.gov/synthetic-mineral-fibers. Published Mar. 18, 2006. Accessed Oct. 14, 2020. (Year: 2006).*

(Continued)

*Primary Examiner* — Atul P. Khare
(74) *Attorney, Agent, or Firm* — Oblon, McClelland, Maier & Neustadt, L.L.P.

(57) ABSTRACT

A triaxial laid scrim includes a first, second and third set of continuous fibers. The fibers of each set are regularly spaced apart and are parallel to each other. The fibers of the first set are parallel to the warp direction or to the weft direction of the scrim. The fibers of the second set and the third set are oriented symmetrically to each other, respectively at an angle of 30°-80° with respect to the fibers of the first set. Distances between the fibers of the second set and the fibers of the third set are identical. The fibers of the second set cross the fibers of the third set at the intersection thereof with the fibers of the first set, thereby defining regular openings having an isosceles triangle shape. The fibers are coated and attached to each other by a coating that does not fill-up the triangle-shaped openings.

14 Claims, 2 Drawing Sheets

(51) Int. Cl.
- *D04H 3/12* (2006.01)
- *D04H 3/04* (2012.01)
- *E04B 1/76* (2006.01)
- *B32B 5/02* (2006.01)
- *B29C 65/00* (2006.01)
- *E04B 1/74* (2006.01)
- *E04C 5/07* (2006.01)

(52) U.S. Cl.
CPC ............. *B29C 70/683* (2013.01); *D04H 3/04* (2013.01); *D04H 3/12* (2013.01); *E04B 1/76* (2013.01); *B29C 66/69* (2013.01); *D10B 2401/063* (2013.01); *D10B 2505/02* (2013.01); *E04B 2001/742* (2013.01); *E04B 2001/7683* (2013.01); *E04C 5/073* (2013.01)

(56) References Cited

U.S. PATENT DOCUMENTS

| | | |
|---|---|---|
| 2004/0077242 A1 | 4/2004 | Layman |
| 2007/0037462 A1 | 2/2007 | Allen et al. |
| 2008/0045109 A1* | 2/2008 | Ogata ........................ D01F 8/00 442/364 |
| 2008/0253712 A1 | 10/2008 | Allen et al. |
| 2013/0280476 A1* | 10/2013 | Davis ...................... B32B 5/022 428/109 |
| 2015/0202837 A1* | 7/2015 | Coetzee .................. B29C 70/24 156/148 |

FOREIGN PATENT DOCUMENTS

| | | | |
|---|---|---|---|
| JP | 6-32231 A | | 2/1994 |
| JP | 06032231 A | * | 2/1994 |
| JP | 11020059 A | * | 1/1999 |
| JP | 2006-70396 A | | 3/2006 |
| JP | 2006070396 A | * | 3/2006 |
| WO | WO 01/25564 A2 | | 4/2001 |
| WO | WO 2013/148696 A1 | | 10/2013 |

OTHER PUBLICATIONS

"Mineral Fiber." CAMEO, cameo.mfa.org/wiki/Mineral_fiber. Published May 9, 2016. Accessed Oct. 14, 2020. (Year: 2016).*

International Search Report dated Mar. 27, 2017, in PCT/EP2016/081565 filed Dec. 16, 2016.

Office Action dated Mar. 8, 2021 in Indian Patent Application No. 201817022114, 5 pages.

* cited by examiner

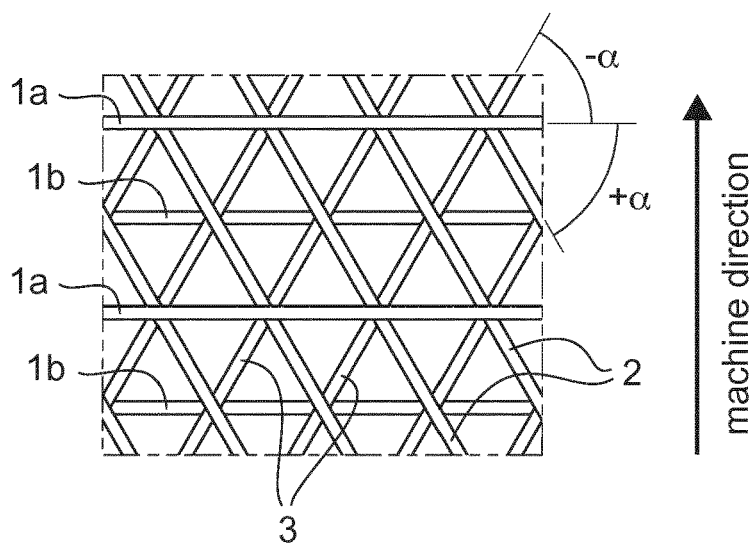
Fig.1
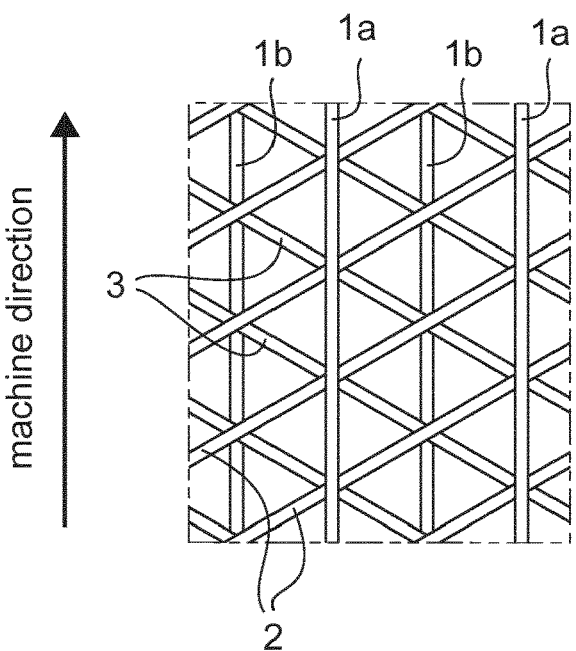
Fig.2
Fig.3
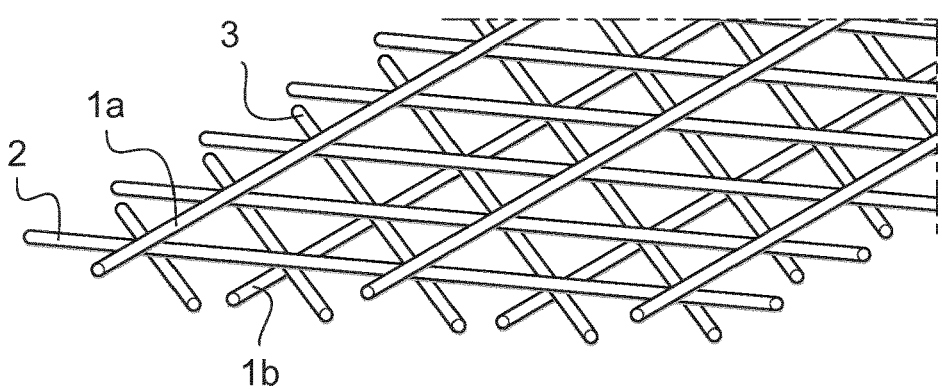

TRIDIRECTIONAL LAID SCRIMS FOR REINFORCEMENT PURPOSES

The present invention is drawn to a tri-directional laid open scrim made of high modulus fibers. The scrim is intended to be used as reinforcement fabric for hydraulically bound materials, such as mortars, especially in External Thermal Insulation Complex Systems.

Open glass fiber mesh fabrics are currently used in External Thermal Insulation Complex Systems (ETICS) to reinforce the render coating and facilitate application thereof to the underlying thermal insulation layer (foam, glass wool, etc.). Such glass fiber fabrics are generally coated with rubber coatings, typically SBR rubber, to provide the fabric with mechanical strength and protection and to protect the glass fibers against the alkalinity of the render composition.

The mesh-type fabrics used for this purpose are typically woven or knitted bi-directional glass fiber fabrics made of warp (machine direction) and weft (cross-machine direction) yarns or fibers, the warp yarns crossing the weft yarns at right angles (see for example EP 2821536).

Such bidirectional glass fiber fabrics have a rather high tensile modulus when measured in the machine and cross-machine directions, but exhibit rather low modulus and high elongation when stretched in directions significantly different from the machine and cross machine directions. Such high "off-angle" elongation is undesirable because it does not allow equally good prevention of cracks in all directions.

There is a need for an open fabric having a more "isotropic" tensile modulus, i.e. a tensile modulus that is the same or nearly the same in all directions. Such a fabric would efficiently protect the brittle material layer to be reinforced against cracking in all directions.

US2005/0186409 discloses nucleated polypropylene-based bi-axial and tri-axial laid scrims for replacement of coated fiber-glass products as reinforcement fabrics of cementitious boards or panels. The polypropylene scrim is applied on one or both sides of a concrete core layer. Such thermoplastic polymer-based scrims have a far too low tensile modulus to be used as open meshes in ETICS.

WO 2007/142878 discloses a housewrap made from a combination of a low elongation glass fiber scrim and a high elongation polymer fiber scrim. The resulting biaxial or triaxial scrims are not described as being appropriate for reinforcement of brittle hydraulically bound construction materials.

The problem underlying the present invention was to provide a fabric with an open mesh structure exhibiting homogeneously low elongation (i.e. high tensile modulus) when submitted to tensile strength in any direction in the plane of the fabric, i.e. machine direction, cross-machine direction and any intermediate "off-angle" direction.

This problem was solved by a tri-axial laid scrim made of low elongation yarns or fibers and having a very regular structure with substantially identical triangular openings. The fibers of the laid scrim of the present invention are superimposed in at least three layers, each layer being made of substantially parallel fibers.

The present invention is based on the discovery that it was possible to provide a laid scrim with highly "isotropic" tensile strength, i.e. with a tensile strength that is substantially the same in all directions of the plane of the scrim, by crossing three sets of fibers in such a way that there are only triple crossing points. In the present invention, the term "triple crossing point" refers to an intersection of three fibers from three different layers—and consequently oriented in three different directions.

Triaxial scrims are known from the prior art, for example from WO 2007/142878 (FIG. 1) or WO2007/078319 (FIG. 4). In these scrims, there are only a few triple crossing points and most of the intersections are simple intersections of only two fibers.

The subject-matter of the present invention is a triaxial laid scrim, comprising a first, a second and a third set of continuous fibers, wherein
 (a) the fibers of each set of fibers are regularly spaced apart and are parallel to each other,
 (b) the fibers of the first set of fibers are parallel to the warp direction (machine direction) or to the weft direction (cross-machine direction) of the scrim,
 (c) the fibers of the second set of fibers and the fibers of the third set of fibers are oriented symmetrically to each other, respectively at an angle $(-\alpha)$ and $(+\alpha)$ of between 30° and 80°, preferably of between 40 to 70°, with respect to the fibers of the first set of fibers,
 (d) the distance between adjacent fibers of the second set of fibers is identical to the distance between adjacent fibers of the third set of fibers,
 (e) the fibers of the second set of fibers cross the fibers of the third set of fibers at the intersection thereof with the fibers of the first set of fibers, thereby defining regular openings having the shape of isosceles triangles, and
 (f) the fibers are coated and attached to each other by means of a coating that does not fill-up the triangle-shaped openings.

Another subject-matter of the present invention is a textile product comprising such a triaxial laid scrim.

The scrims of the present invention are non-woven scrims where several layers of parallel fibers are superimposed and adhesively bonded together.

The fibers are oriented in three directions, one of which is the warp direction or the weft direction of the scrim. The scrim comprises either warp or weft yarns but not both of them. When the fibers of the first set of fibers are warp fibers (oriented in machine direction) then the scrim has no weft fibers laid at right angle with respect to the first set of fibers. Conversely, when the fibers of the first set of fibers are weft fibers (oriented in cross-machine direction) then the scrim has no warp fibers laid at right angle with respect to the weft fibers.

In a preferred embodiment, the fibers of the first set of fibers are parallel to the warp direction of the scrim.

The second and third sets of fibers, also called "bias fibers" hereafter, have an oblique or slantwise orientation with respect to the first set of fibers. They are oriented symmetrically to each other with an axial symmetry, the symmetry axis being parallel to the direction of the first set of fibers (warp or weft fibers), which means that the angle ($\alpha$) between the first set of fibers (axis of symmetry) and the second set of fibers is identical to the angle between the first set of fibers and the third set of fibers, but in the opposite direction which is noted (+$\alpha$) and (−$\alpha$) in the present application.

The distance between adjacent parallel fibers of the second set of fibers is identical to the distance between adjacent parallel fibers of the third set of fibers. It is advantageously comprised between 3 mm and 30 mm, preferably between 5 and 25 mm, more preferably between 7 and 20 mm and even more preferably between 8 and 15 mm, said distance being defined as the distance between the central axes of two adjacent fibers of the same set of fibers.

In a preferred embodiment the distance between adjacent fibers of the first set of fibers is identical to the distance between adjacent bias fibers. The openings of the scrim then have the shape of equilateral triangles and the fibers of the second and third set of fibers are oriented respectively at an angle (−α) and (+α) of about 60° with respect to the fibers of the first set of fibers. This embodiment is represented at FIG. 1.

When α is smaller than 60°, the distance between the fibers of the first set of fibers is smaller than the distance between adjacent bias fibers. When α is 45°, the triangles are right angle triangles (see FIG. 4), and when α is smaller than 45° the triangles are obtuse isosceles. Conversely, when α is higher than 60° the distance between adjacent fibers of the first set of fibers is higher than the distance between adjacent bias fibers and the triangular openings are acute isosceles (see FIG. 5).

The excellent tensile properties of the scrim of the present invention are due to its highly regular structure made of identical triangular openings. Such a regular structure is characterized by the fact that desirably all fiber cross-points are triple cross-points, i.e. intersections of three fibers from three different set of fibers. The laid scrims of the present invention advantageously comprise less than 20% of simple intersections (=intersection of two fibers), preferably less than 10% of simple intersections more preferably less than 5% of simple intersections, and even more preferably less than 2% of simple intersections, these percentages being expressed with respect to the total number of intersections (simple intersections+triple cross-points).

It is important to understand that the percentage of simple intersections is significantly higher than the percentage of "flawed" or "missed" triple cross-points. As a matter of fact, each "flawed" or "missed" triple cross-point gives rise to three simple intersections. Thus, a triaxial laid scrim of the present invention having 3 out of 100 triple cross-points that are not correctly formed comprises 9 simple intersections for 97 triple cross-points, the total number of intersections being 106. This results in a percentage of 8.5% of simple intersections expressed with respect to the total number of intersections.

All fibers of a set of fibers are not necessarily in the same layer but may be located in two or more distinctive layers of fibers. In other words each set of fibers may be divided into two or more subsets of fibers, each subset forming a separate layer of fibers.

In a particular embodiment the fibers of the first set of fibers are divided into a first subset of fibers and second subset of fibers. The two subsets form respectively the two outermost layers of the laid scrim, with the two layers of bias fibers preferably being sandwiched between these two outer layers. In this embodiment, preferably every other fiber of the first set of fibers is part of the same subset of fibers, i.e. the fibers from the first subset are alternated with the fibers of the second subset as shown in FIG. 3.

A preferred triaxial laid scrim of the invention is thus made of the following four layers of fibers,

- a first layer consisting of the fibers of the first subset of the first set of fibers,
- a second layer consisting of the fibers of the second set of fibers,
- a third layer consisting of the fibers of the third set of fibers, and
- a fourth layer of fibers consisting of the fibers of the first subset of the first set of fibers.

The purpose of the present invention is to provide reinforcing fabrics exhibiting uniformly high tensile strength and low elongation at break.

The fibers or yarns should therefore be selected from high resistance fibers or yarns exhibiting a tensile strength at break of at least 0.8 GPa, preferably of between 1 and 10 GPa, more preferably of between 1.1 and 5.0 GPa, and even more preferably of between 1.2 and 1.8 GPa, an elastic modulus comprised between 50 GPa and 200 GPa, preferably between 60 and 100 GPa, and elongation at break of at most 10%, preferably of at most 5%, and even more preferably of at most 3%.

The tensile strength at break, elastic modulus and elongation at break are measured according to the corresponding standards (see for example ISO-3341—Textile glass. Yarns. Determination of breaking force and breaking elongation; ASTM-D7269—Standard Test Methods for Tensile Testing of Aramid Yarns; ISO-13002—Carbon fibre. Designation system for filament yarns) on the uncoated fibers or yarns.

The fibers are preferably selected from the group consisting of mineral fibers, aramid fibers and carbon fibers. E-glass fibers are most preferred.

Mineral fibers are preferably multifilament yarns having a tenacity (tensile strength) measured according to ISO 3341 of at least 30 cN/tex, preferably of between 50 and 400 cN/tex, and more preferably of between 60 and 300 cN/tex.

The non-coated fibers of the laid scrims of the present invention advantageously have a linear density comprised between 60 and 600 tex, preferably between 70 and 500 tex, and more preferably between 80 and 450 tex.

In a preferred embodiment the chemical nature and linear density of the fibers of the three sets of fibers are identical, i.e. the same fibers are used for the three sets of fibers, thereby contributing to highly isotropic mechanical properties of the resulting laid scrim.

The three or more layers of fibers are adhesively held together by means of a coating completely surrounding the fibers. This coating is thin enough not to obstruct the triangular openings of the non-coated scrim. It is applied to the final assembly of the three or more layers of fibers.

The coating advantageously comprises an organic polymer, which is preferably an elastomer, and inorganic filler.

The coating may be applied to the uncoated glass fabric without any pretreatment.

The total amount of organic polymer in the coating may be expressed as the loss-on-ignition (LOI), measured according to EN ISO 1887 of the final polymer-coated fabric.

The organic polymer coating generally comprises between 6 wt % and 20 wt %, preferably between 7 wt % and 15 wt %, and more preferably between 8 and 12 wt % of the final coated scrim.

Preferred organic polymers are selected from the group selected from styrene-butadiene rubber (SBR), polyvinyl alcohol (PVOH), polyvinyl chloride (PVC), polyvinylidene chloride (PVDC), acrylic polymers, olefinic polymers, ethylene vinyl acetate (EVA), phenolic resins, polyamides, acrylamides, vinyl esters, and mixtures thereof.

The inorganic filler is preferably selected from the group consisting of calcium hydroxide, kaolin, calcium carbonate and silica sand, and preferably comprises from 1 to 60% by weight, more preferably from 5 to 50% by weight and even more preferably from 10 to 40% by weight of the dried coating.

The final coated triaxial laid scrim of the present invention preferably has a surface weight of between 50 g/m$^2$ and 600 g/m$^2$, more preferably of between 100 g/m$^2$ and 500 g/m$^2$, and even more preferably of between 130 g/m$^2$ and 200 g/m$^2$.

The thickness and number per unit surface of the fibers should be sufficiently high to provide the scrim with directionally homogenous high tensile strength and low elongation.

The "openness" of the coated laid scrim, defined as the ratio of the total surface of the triangular openings to the total surface of the scrim, is preferably comprised between 50% and 80%, more preferably between 55% and 80%, and even more preferably between 60 and 75%.

The laid scrim may be part of a textile product comprising a triaxial laid scrim as described above.

In such a textile product one or more scrims, preferably only one scrim, are bonded to one or more woven, knitted or non-woven fabrics such as glass veils, non-woven polymer mats, or polymer films.

The laid scrims of the present invention exhibiting directionally uniform high elastic modulus, high tensile strength and low elongation are particularly suitable for reinforcement of solid materials, in particular of mineral high strength and low elongation materials such as hydraulically bound materials. By "hydraulically bound materials" is meant here a material obtained by hardening of a mixture containing a hydraulic binder and water. Hydraulic binders may be selected from the group consisting of Portland cement, hydraulic limes, aluminous cements, calcium sulfo-aluminate cements and alkali-activated cements.

A method of reinforcing a solid material, may comprise embedding a triaxial laid scrim or a textile product of the present invention into a viscous base material, preferably a base material comprising water and a hydraulic binder, and then hardening the viscous base material.

Another subject-matter of the present invention is a hydraulically bound solid product or material comprising a triaxial laid scrim as described above. The hydraulically bound solid product or material preferably is selected from the group consisting of a wall, a floor, a panel, a profile, a slab, a pipe, a tube, a corner, and the surface render of an external thermal insulation complex system (ETICS).

The present invention is now described in detail with reference to the attached drawings wherein FIG. 1 shows a first embodiment of a laid scrim of the present invention;

FIG. 2 is second embodiment of a laid scrim of the present invention;

FIG. 3 is a perspective view of the laid scrim of FIG. 2;

In the laid scrim depicted at FIG. 1, the fibers of the first set of fibers 1a,1b are weft fibers and are parallel to the cross-machine direction. A first set of bias fibers 2 is oriented at an angle +α of 60° with respect to the fibers of the first set of fibers. A second set of bias fibers 3 is oriented at an angle −α of 60° with respect to the fibers of the first set of fibers. The distance between the parallel fibers of each set of fibers is identical in all three sets of fibers. All intersections are triple cross-points, i.e. intersections of three fibers. All openings exhibit a shape of equilateral triangles.

The first set of fibers comprises a first subset of fibers 1a and a second subset of fibers 1b, the fibers of the first and second subsets being located in different layers of the laid scrim.

The scrim of FIG. 2 is identical to the scrim of FIG. 1 except for the fact that the fibers 1a,1b are warp fibers oriented in the machine direction.

The perspective view of FIG. 3 shows the four-layer structure of the laid scrim of the present invention:
an undermost first layer made of warp fibers 1b,
a second layer made of bias fibers 2,
a third layer made of bias fibers 3, and
a uppermost forth layer made of warp fibers 1a,
the warp fibers of the first and fourth layers all being parallel to each other.

Figure 4:
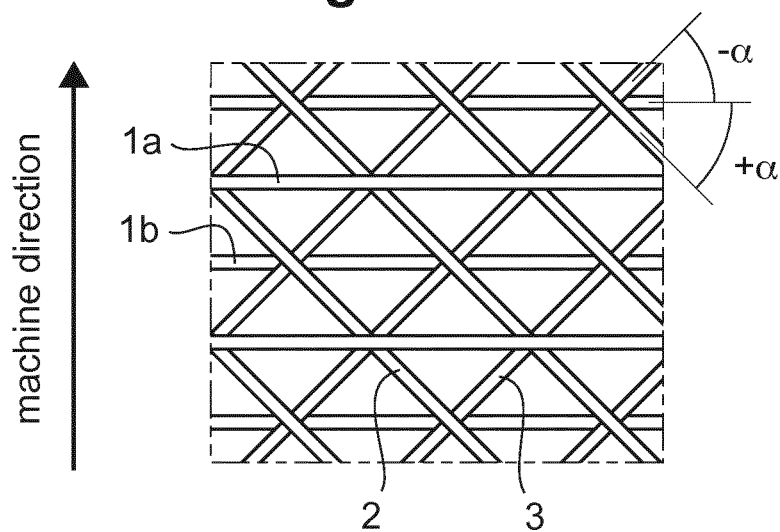
FIG. 4 is a third embodiment of a laid scrim of the present invention.

FIG. 4 shows an embodiment of a laid scrim of the present invention where α is about 45°. The resulting openings are right angle isosceles.

Figure 5:
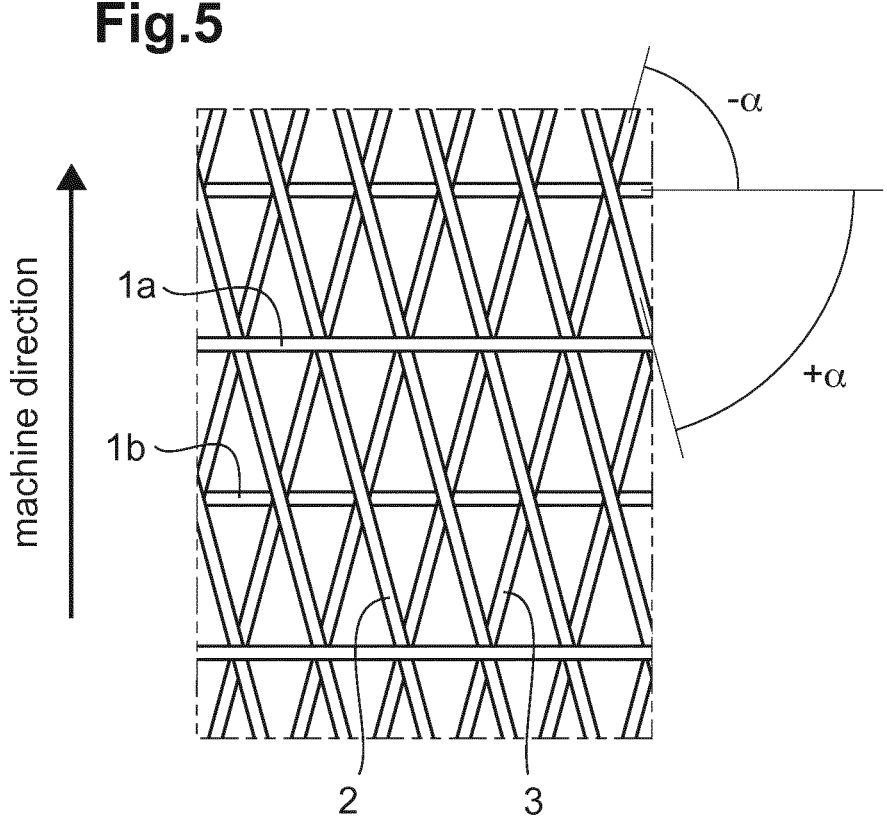
FIG. 5 is a forth embodiment of a laid scrim of the present invention.

FIG. 5 shows an embodiment where α is significantly higher than 60° resulting in openings having a shape of acute isosceles.

The invention claimed is:

1. A method of reinforcing a solid material, the method comprising:
    embedding a triaxial laid scrim into a viscous base material; and
    hardening the viscous base material so as to obtain a solid material comprising the triaxial laid scrim,
    wherein:
        the triaxial laid scrim comprises a first, second, and third set of continuous fibers and comprises less than 10% of simple intersections with respect to a total number of simple intersections and triple cross-points, the fibers of the first set of continuous fibers are regularly spaced apart and are parallel to each other, the fibers of the second set of continuous fibers are regularly spaced apart and are parallel to each other, and the fibers of the third set of continuous fibers are regularly spaced apart and are parallel to each other,
        the fibers of each of the first, second and third set of continuous fibers are mineral fibers,
        the fibers of the first set of fibers are parallel to the warp direction (machine direction) or to the weft direction (cross-machine direction) of the scrim,
        the fibers of the second set of fibers and the fibers of the third set of fibers are oriented symmetrically to each other, respectively at an angle of between 30° and 80° with respect to the fibers of the first set of fibers,
        a distance between the fibers of the second set of fibers is identical to a distance between the fibers of the third set of fibers,
        the fibers of the second set of fibers cross the fibers of the third set of fibers at an intersection of the fibers of the third set of fibers with the fibers of the first set of fibers, thereby defining regular openings having the shape of isosceles triangles, and
        prior to said embedding, the fibers of each of the first, second, and third sets of continuous fibers of the triaxial laid scrim are coated and attached to each other by means of a coating comprising organic polymer that does not fill-up the isosceles triangle-shaped openings, wherein the organic polymer is present in the coating in an amount of 6 wt % to 20 wt % of the triaxial laid scrim as expressed as loss-on-ignition.

2. The method according to claim 1, wherein the fibers of the second and third set of fibers are oriented respectively at an angle of about 60°, with respect to the fibers of the first set of fibers, thereby defining the openings to have the shape of equilateral triangles.

3. The method according to claim 1, wherein the fibers of the first set of fibers are divided into a first subset of fibers and a second subset of fibers, each of the first subset and the second subset of fibers forming a separate layer of fibers.

4. The method according to claim 3, the coated triaxial laid scrim comprising the following four layers of fibers,
- a first layer consisting of the fibers of the first subset of the first set of fibers,
- a second layer consisting of the fibers of the second set of fibers,
- a third layer consisting of the fibers of the third set of fibers, and
- a fourth layer of fibers consisting of the fibers of the second subset of the first set of fibers.

5. The method according to claim 1, wherein the distances between the regularly spaced apart parallel fibers of the first, second, and third set of fibers are between 3 mm and 30 mm, said distances being defined as the distance between the central axes of two adjacent fibers of the same set of fibers.

6. The method according to claim 1, the coated triaxial laid scrim having a surface weight of between 50 g/m$^2$ and 600 g/m$^2$.

7. The method according to claim 1, wherein the fibers of the first set of fibers are parallel to the warp direction of the scrim.

8. The method according to claim 1, the coated triaxial laid scrim having an openness, defined as a ratio of a total surface of the isosceles triangle-shaped openings to a total surface of the laid scrim, of between 50% and 80%.

9. The method according to claim 8, wherein the openness is between 60% and 75%.

10. The method according to claim 1, wherein the distances between the regularly spaced apart parallel fibers of the first, second, and third set of fibers are between 8 mm and 15 mm, said distances being defined as the distance between the central axes of two adjacent fibers of the same set of fibers.

11. The method according to claim 1, wherein the coating is an elastomer coating.

12. The method according to claim 1, the coated triaxial laid scrim having a surface weight of between 130 g/m$^2$ and 200 g/m$^2$.

13. The method according to claim 1, the coated triaxial laid scrim comprising less than 2% of the simple intersections.

14. The method according to claim 1, wherein the viscous base material comprises water and a hydraulic binder.

* * * * *